United States Patent
Yoon et al.

(10) Patent No.: US 7,860,092 B2
(45) Date of Patent: Dec. 28, 2010

(54) SYSTEM AND METHOD FOR SIMULTANEOUSLY OFFERING LAYER-2 MULTICAST SWITCHING AND LAYER-3 MULTICAST ROUTING

(75) Inventors: Hyeon Sik Yoon, Daejeon (KR); Kwang Suk Song, Daejeon (KR); Bong Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 620 days.

(21) Appl. No.: 11/586,954

(22) Filed: Oct. 26, 2006

(65) Prior Publication Data

US 2007/0104192 A1 May 10, 2007

(30) Foreign Application Priority Data

Nov. 8, 2005 (KR) ............ 10-2005-0106703

(51) Int. Cl.
*H04L 12/28* (2006.01)
*H04L 12/56* (2006.01)
*H04J 3/26* (2006.01)

(52) U.S. Cl. ............... 370/390; 370/432
(58) Field of Classification Search ......... 370/389, 370/390, 464, 465, 473
See application file for complete search history.

(56) References Cited

U.S. PATENT DOCUMENTS

| 7,406,076 | B2 * | 7/2008 | Katoh | 370/390 |
| 2002/0012585 | A1 * | 1/2002 | Kalkunte et al. | 415/137 |
| 2004/0037279 | A1 * | 2/2004 | Zelig et al. | 370/390 |

FOREIGN PATENT DOCUMENTS

| KR | 1020020004547 | 1/2002 |
| KR | 1020020050570 | 6/2002 |

* cited by examiner

*Primary Examiner*—Chirag G Shah
*Assistant Examiner*—Srinivasa R Reddivalam
(74) *Attorney, Agent, or Firm*—Ladas & Parry LLP (57) ABSTRACT

Provides is a method for processing a multicast packet received in a system for simultaneously providing virtual interface-based layer-2 multicast switching and layer-3 multicast routing. When a destination MAC address of a received Ethernet frame is a multicast MAC address, a VLAN-based layer-2 multicast switching function is performed. When a destination IP address of a received Ethernet frame is a multicast IP address, a virtual interface-based layer-3 multicast routing function is simultaneously performed within the same system.

13 Claims, 4 Drawing Sheets

SYSTEM AND METHOD FOR SIMULTANEOUSLY OFFERING LAYER-2 MULTICAST SWITCHING AND LAYER-3 MULTICAST ROUTING

RELATED APPLICATION

The present application is based on, and claims priority from, Korean Application Number 2005-0106703, filed Nov. 8, 2005, the disclosure of which is hereby incorporated by reference herein in its entirety.

BACKGROUND OF THE INVENTION

1. Field of the Invention

The present invention relates to a system and a method for switching multicast data in an Ethernet network, and more particularly, to a system and a method for simultaneously providing a layer-2 multicast switching function and a layer-3 multicast routing function on the basis of a virtual interface.

2. Description of the Related Art

A recent network equipment based on an Ethernet constituting the Internet is roughly classified into a switch performing a switching function of a 2 layer and a router performing a routing function of a 3 layer.

The Ethernet-based 2 layer multicast switching function conforms to Institute of Electrical and Electronics Engineers (IEEE) 802.1D and 802.1Q. In operation, a multicast Ethernet frame in an Ethernet network is a frame where a lowermost bit of an uppermost byte of a 6-byte destination media access control (MAC) address is set to 1, that is, a first byte is displayed as 0x01.

Also, a frame of the multicast Ethernet frames where upper 3 bytes of a 6-byte destination media access control (MAC) address are displayed as 0x01, 0x80, and 0xC2 is a bridge protocol data unit (BPDU) frame, and is used for delivering a control message between switches, and should not be forwarded but transmitted to a controller for processing. On the other hand, a frame of the multicast Ethernet frames where upper 3 bytes of a 6-byte destination MAC address are displayed as 0x01, 0x00, and 0x5E is an Ethernet frame for multicast data. When a corresponding switch provides a layer-2 multicast table, the Ethernet frame for the multicast data is delivered to only a corresponding output port. However, when the corresponding switch does not provide a separate layer-2 multicast table, the Ethernet frame for the multicast data is forwarded to all output ports. Of course, when the corresponding switch provides a virtual local area network (VLAN) function, the Ethernet frame is forwarded to only a VLAN member port.

On the other hand, an Ethernet-based layer-3 multicast routing function conforms Internet Engineering Task Force (IETF) standards. In operation, a layer-3 multicast routing function in a router system uses multicast routing protocols such as Internet Group Management Protocol (IGMP), Protocol Independent Multicast-Sparse Mode (PIM-SM), Protocol Independent Multicast-Dense Mode (PIM-DM), etc., and establishes a multicast forwarding table for determining forwarding of an input packet through communication with an adjacent router or terminal. At this point, a multicast IP packet has a destination IP address of 224.0.0.0~239.255.255.255, which is a class D IP address.

A procedure for processing an input multicast IP packet will be described. When a destination IP address of an input packet is a well-known multicast address assigned by Internet Assigned Numbers Authority (IANA), the input packet should be processed by a controller, and so is not forwarded and delivered to the controller. For the other multicast packets, a multicast forwarding table is explored. When a corresponding entry exists on the table, a multicast packet is forwarded to a corresponding output port. When the corresponding entry does not exist on the table, a multicast packet is destroyed or delivered to the controller so that the multicast packet is processed by upper multicast protocols.

As described above, an Ethernet-based network equipment that constitutes the Internet is classified into a switch and a router depending on a function performed by each equipment. However, a technology develops recently, a demand for providing two functions in one system increases. In this trend, by having a low-priced switch equipment perform a routing function, a user may purchase only a switch equipment that can perform a routing function instead of purchasing both a switch and a router in order to receive Internet service. Such a switch equipment that can perform a routing function can provide a great advance in an aspect of price.

On the other hand, in a current trend where communication and broadcasting are merged, a demand for viewing broadcasting through the Internet is added. For this purpose, a multicast-related function has emerged as an important issue in a network equipment. Therefore, a switch equipment that can perform a routing function requires efficient layer-2 and layer-3 multicast packet processing functions.

SUMMARY OF THE INVENTION

The present invention provides a system and a method for simultaneously performing a layer-2 multicast switching function and a layer-3 multicast switching function in a VLAN-based layer-2 switch that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a system for simultaneously providing layer-2 multicast switching and layer-3 multicast routing, wherein a VLAN-based layer-2 switch performs a virtual interface-based layer-3 routing function, the system including: a physical interface for receiving an Ethernet frame; a VLAN defined on the physical interface, for performing a layer-2 multicast switching function on the received Ethernet frame through the same LAN; a virtual interface for interfacing between the VLAN and a layer-3 router; and a virtual router for mapping an ID of the VLAN to the virtual interface to perform a virtual interface-based layer-3 multicast routing function.

According to an aspect of the present invention, there is provided a method for simultaneously providing layer-2 multicast switching and layer-3 multicast routing, wherein a VLAN-based layer-2 switch performs a virtual interface-based layer-3 routing function, the method including: receiving an Ethernet frame through a physical interface; judging whether a destination MAC address of the received Ethernet frame is a multicast MAC address, copying the same packet when the destination MAC address of the received Ethernet frame is the multicast MAC address as a result of the judgment, and performing a VLAN-based layer-2 multicast switching function; and judging whether a destination IP address of the received Ethernet frame is a multicast IP address, and when the destination IP address of the received Ethernet frame is the multicast IP address as a result of the judgment, performing a virtual interface-based layer-3 multicast routing function.

Provided are a system and a method for simultaneously providing virtual interface-based layer-2 multicast switching and layer-3 multicast routing. For this purpose, the present invention proposes realizing a virtual interface-based layer-3 routing function in a VLAN-based layer-2 switch and, when a multicast packet is input to a predetermined system, processing the input multicast packet.

A packet processing method in case that a multicast packet is input to a system of the present invention will be described. A layer-2 multicast table at an ingress side is explored using a destination MAC address of a predetermined packet and a VLAN ID for key values, and when a coinciding entry exists, the packet is copied and forwarded to a corresponding destination, and a layer-3 multicast table at an ingress side is explored.

On the other hand, when the coinciding entry does not exist as a result of the exploring of the layer-2 multicast table at the ingress side, the layer-3 multicast table at the ingress side is explored again. After that, when the coinciding entry exists as a result of the exploring of the layer-3 multicast table at the ingress side, packets are copied and forwarded as many as necessary to a corresponding destination. When the coinciding entry does not exist, the packet is destroyed or delivered to a central processing unit (CPU) or a processor block so that the packet is processed by upper-layer multicast protocols.

A processing procedure at an egress side after a multicast packet passes through a switching board will be described. In case of a layer-2 multicast forwarding, a layer-2 multicast table at an egress side is explored using a multicast ID (MID) for a key value, and packets are copied and forwarded as many as the number of the coinciding ports. Also, in case of a layer-3 multicast forwarding, a layer-3 multicast table at an egress side is explored using a multicast ID (MID) for a key value, and packets are copied and forwarded as many as the number of the coinciding ports.

A system and a method of the present invention provide an efficient multicast method essential to an environment integrating broadcasting and communication, which is a current important trend, so that usefulness of a system for simultaneously providing layer-2 switching and layer-3 routing can be improved.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
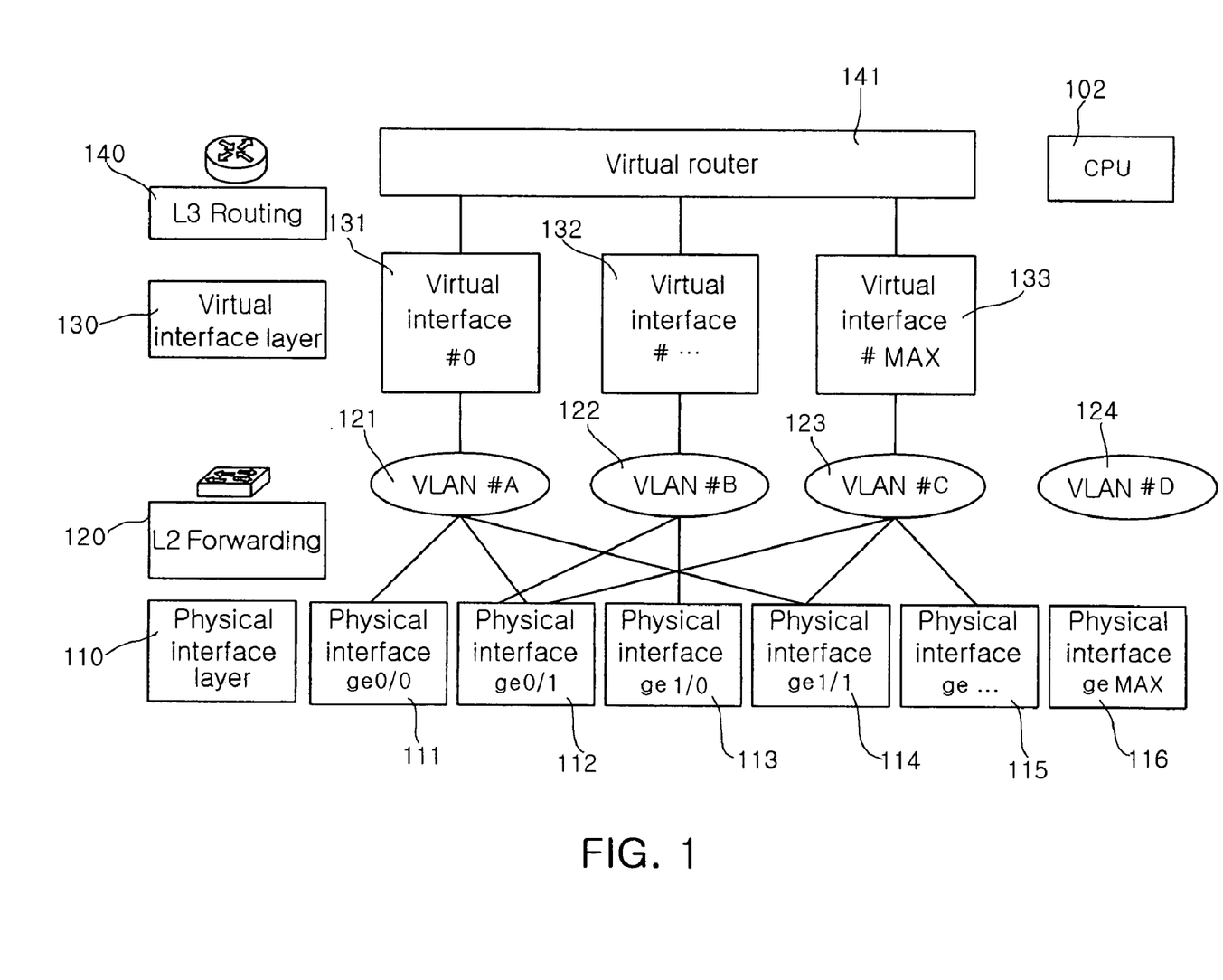
FIG. 1 is a view of a system for simultaneously providing layer-2 multicast switching and layer-3 multicast routing according to the present invention.

FIG. 1 is a view of a system for simultaneously providing layer-2 multicast switching and layer-3 multicast routing according to the present invention.

Referring to FIG. 1, the system includes: a physical interface layer 110; a second layer (L2 forwarding) 120; a virtual interface layer 130; and a third layer (L3 routing) 140. The system simultaneously provides layer-2 multicast switching and layer-3 multicast routing according to the present invention on the basis of a virtual interface.

The physical interface layer 110 includes one or more physical interfaces 111 to 116, and the second layer 120 includes one or more virtual local area networks (VLANs) 121 to 124. Also, the virtual interface layer 130 includes one or more virtual interfaces 131 to 133, and the third layer 140 includes a virtual router 141. Also, the system further includes a CPU 150 or a processor block for processing at an upper layer.

The system according to the present invention simultaneously provides layer-2 multicast switching and layer-3 multicast routing by performing, at a VLAN-based layer-2 switch, a virtual interface-based layer-3 routing function. For this purpose, the physical interface layer 110 receives an Ethernet frame, and the VLANs 121-124 are defined on the physical interface 110 to perform a layer-2 multicast switching function on the received Ethernet frame through the same VLAN.

After that, the virtual interface layer 130 interfaces between the VLANs 121-124 and the virtual router 141 of the third layer 140, and the virtual router 141 maps a LAN ID of the VLANs 121-124 to one of the VLANs to perform a virtual interface-based layer-3 multicast routing function.

At this point, the VLANs 121-124 judge whether a destination media access control (MAC) address of the received Ethernet frame is a multicast MAC address. When the destination MAC address of the received Ethernet frame is the multicast MAC address as a result of the judgment, the layer-2 multicast switching function is performed.

Also, the virtual router 141 judges whether a destination Internal protocol (IP) address of the received Ethernet frame is a multicast IP address. When the destination IP address of the received Ethernet frame is the multicast IP address as a result of the judgment, the layer-3 multicast routing function is performed.

By doing so, a virtual interface-based one switching system can simultaneously provide virtual interface-based layer-2 multicast switching and layer-3 multicast routing function for a multicast packet received therein.

Figure 2:
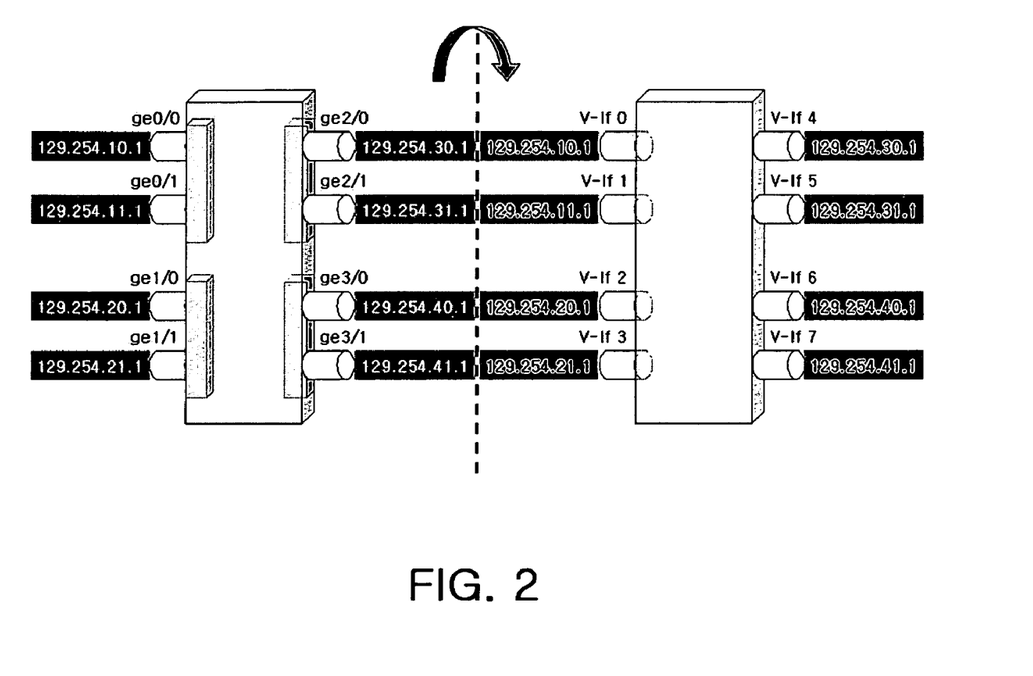
FIG. 2 is a view comparing a concept of a conventional physical interface-based routing setting and a concept of a virtual interface-based routing setting according to the present invention.

FIG. 2 is a view comparing a concept of a conventional physical interface-based routing setting and a concept of a virtual interface-based routing setting according to the present invention. Referring to FIG. 2, a system for simultaneously providing layer-2 multicast switching and layer-3 multicast routing according to the present invention uses a virtual interface-based routing setting concept shown in the right of FIG. 2, which is different from a conventional physical interface-based routing setting concept shown in the left of FIG. 2.

An operation of a virtual interface-based system for simultaneously providing layer-2 multicast switching and layer-3 multicast routing according to the present invention will be described in detail with reference to FIGS. 3 and 4.

Figure 3:
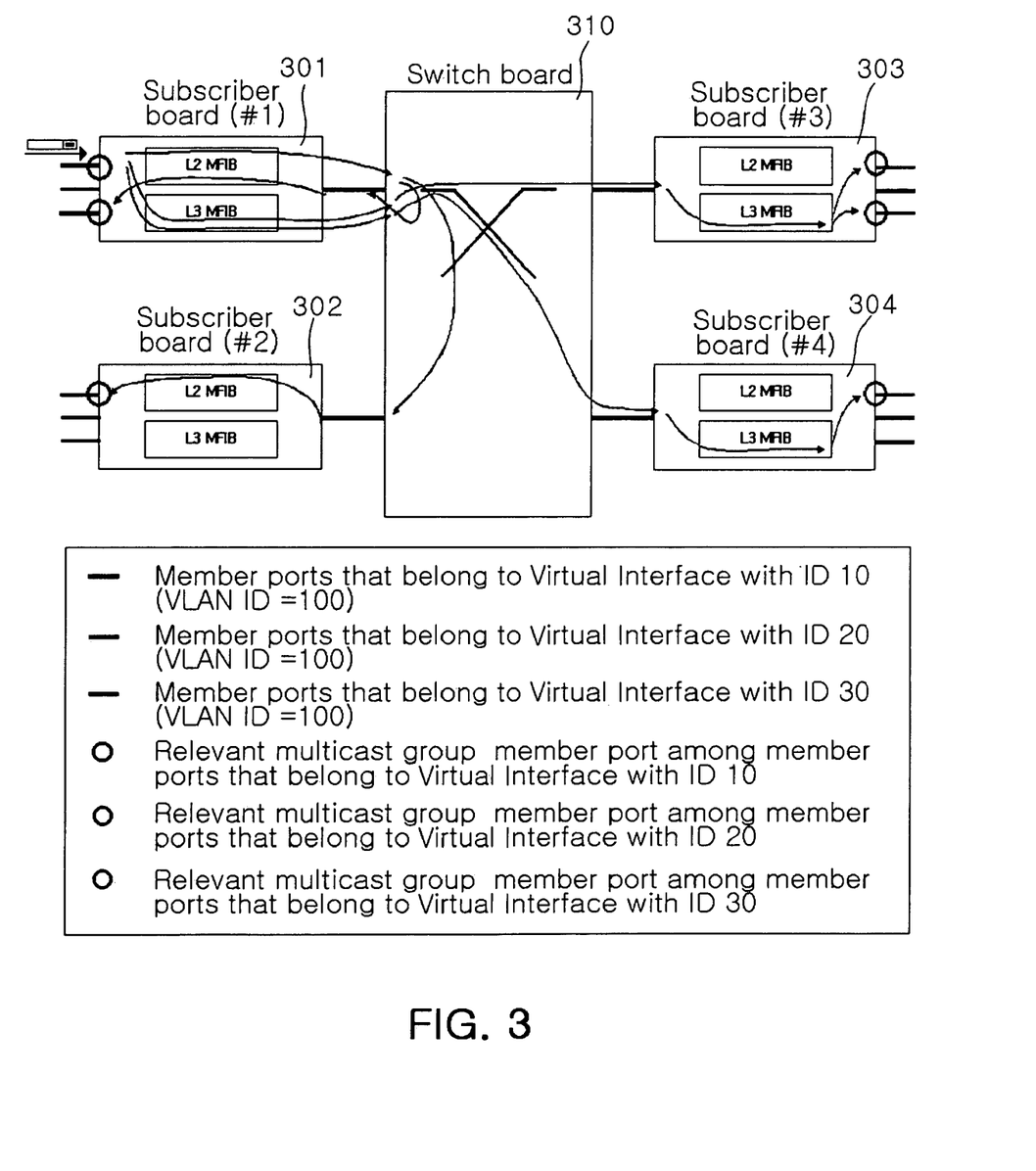
FIG. 3 is a view illustrating packet forwarding when a multicast packet is input on a system for simultaneously providing layer-2 multicast switching and layer-3 multicast routing according to an embodiment of the present invention.

FIG. 3 is a view illustrating packet forwarding when a multicast packet is input on a system for simultaneously providing layer-2 multicast switching and layer-3 multicast routing according to an embodiment of the present invention.

Referring to FIG. 3, when a multicast packet is input to a subscriber board (#1) 301, layer-2 multicast tables at an ingress side shown in Tables 1 and 2 are explored. At this point, Table 1 shows key values contained in the layer-2 multicast table at the ingress side, and Table 2 shows result values according to the key values of Table 1.

TABLE 1

| FIELD NAME | BYTE OFFSET | SIZE | NOTE |
|---|---|---|---|
| GDA | 0 | 6 | Group Destination Address |
| VID | 6 | 2 | VLAN ID |

TABLE 2

| FIELD NAME | BYTE OFFSET | SIZE | NOTE |
|---|---|---|---|
| Ctrl bits | 0 | 1 | 0-valid 1-match |
| GDA MID OFF | 1 | 2 | Multicast ID |
| GDA_OUT_CHAN_BIMAP_OFF | 3 | 4 | Bitmap of Channels belonging to multicast group |

Referring to Tables 1 and 2, key values contained in the layer-2 multicast table at the ingress side are destination MAC addresses of input Ethernet frames and VLAN IDs, and result values according to the key values of Table 1 are MIDs and output subscriber board #. At this point, result values shown in Table 2 are used for exploration key values contained in the layer-2 multicast table at the egress side shown in Table 3 below.

TABLE 3

| FIELD NAME | BYTE OFFSET | SIZE | NOTE |
|---|---|---|---|
| MID | 0 | 2 | Multicast ID |

Result values for key values contained in the layer-2 multicast table at the egress side shown in Table 3 are shown in Table 4.

TABLE 4

| FIELD NAME | BYTE OFFSET | SIZE | NOTE |
|---|---|---|---|
| Ctrl bits | 0 | 1 | 0-valid 1-match |
| GDA_OUT_PORT_BITMAP_OFF | 1 | 4 | Bitmap of Ports belonging to multicast group |

Meanwhile, when a layer-2 multicast group member that coincides with a value of Tables 1 and 2 exists as a result of the exploring of Tables 1 and 2, a corresponding packet is copied and transmitted to a switch board 310. After that, layer-3 multicast tables at an ingress side shown in Tables 5 and 6 are explored. At this point, Table 5 shows key values contained in the layer-3 multicast table at the ingress side, and Table 6 shows result values according to the key values of Table 5.

TABLE 5

| FIELD NAME | BYTE OFFSET | SIZE | NOTE |
|---|---|---|---|
| DIP | 0 | 4 | Destination IP |

TABLE 6

| FIELD NAME | BYTE OFFSET | SIZE | NOTE |
|---|---|---|---|
| Ctrl bits | 0 | 1 | 0-valid 1-match |
| MIP_RESERVE_OFF | 1 | 2 | Reserved |
| MIP_MID_OFF | 3 | 2 | Multicast ID |
| MIP_OUT_CHAN_OFF | 5 | 4 | Bitmap of channels belonging to multicast group |
| MIP_NH_MAC_OFF | 9 | 6 | Nexthop MAC |
| MIP_QOS_OFF | 15 | 1 | Priority |
| MIP_VLAN_TAG_OFF | 16 | 1 | New VLAN Tag |

Referring to Table 5, key values contained in the layer-3 multicast table at the ingress side are destination IP addresses of input Ethernet frames, and results shown in Table 6 are MIDs, output subscriber board #, and VLAN IDs mapped to related virtual interfaces, which are to be used for exploration key values of the layer-3 multicast table at the egress side. The exploration key values of the layer-3 multicast table at the egress side, and the result values thereof can be shown in Tables 7 and 8.

TABLE 7

| FIELD NAME | BYTE OFFSET | SIZE | NOTE |
|---|---|---|---|
| MID | 0 | 2 | Multicast ID |

TABLE 8

| FIELD NAME | BYTE OFFSET | SIZE | NOTE |
|---|---|---|---|
| Ctrl bits | 0 | 1 | 0-valid 1-match |
| MIP_RESERVE_OFF | 1 | 3 | Reserved |
| MIP_OUT_PORT_OFF | 4 | 4 | Bitmap of Ports belonging to multicast group |

Meanwhile, referring to FIG. 3, since there exist two coinciding layer-3 multicast members in the subscriber board (#1) 301, corresponding two packets are copied, a VLAN ID of each packet is changed and transmitted to a switch board 310. When there exist no coinciding entry as a result of exploring of the layer-3 multicast table at the ingress side, a corresponding packet is destroyed or delivered to a CPU or a processor block so that the packet is processed by upper-layer multicast protocols. At this point, a range of MID values to be used for the layer-2 multicast table at the egress side, and a range of MID values to be used for the layer-3 multicast table at the egress side may be discriminated for use in advance.

An operation in the egress side will be described. Referring to FIG. 3, when a multicast packet is received in a subscriber board (#2) 302 through layer-2 multicast, layer-2 multicast tables at the egress side shown in Tables 3 and 4 are explored. At this point, the MIDs are used for the key values, and a number of an output port within a subscriber board to which a corresponding packet should be output is provided as a result value. At this point, the subscriber board 302 may copy packets as many as the number of output ports and output the same to a corresponding port.

Also, referring to FIG. 3, when a multicast packet is received in a subscriber board (#3) 303 and a subscriber board (#4) 304 through layer-3 multicast, layer-3 multicast tables at the egress side shown in Tables 7 and 8 are explored.

At this point, the MIDs are used for the key values, and a number of an output port within a subscriber board to which a corresponding packet should be output is provided as a result value. At this point, the subscriber boards 303 and 304 may copy packets as many as the number of output ports and output the same to a corresponding port. In this case, unlike the case of forwarding through the layer-2 multicast, a transmission MAC address should be changed and a TTL value of a corresponding packet may be reduced by 1.

At this point, the same VLAN ID as that of a received packet is output as a VLAN for a layer-2 multicast forwarding. On the other hand, a VLAN ID is changed into a VLAN ID mapped to a virtual interface, which is a layer-3 multicast group member and output as a VLAN for a layer-3 multicast forwarding.

A procedure of processing a multicast frame to be processed by a system of the present invention will be described in detail with reference to FIG. 4.

Figure 4:
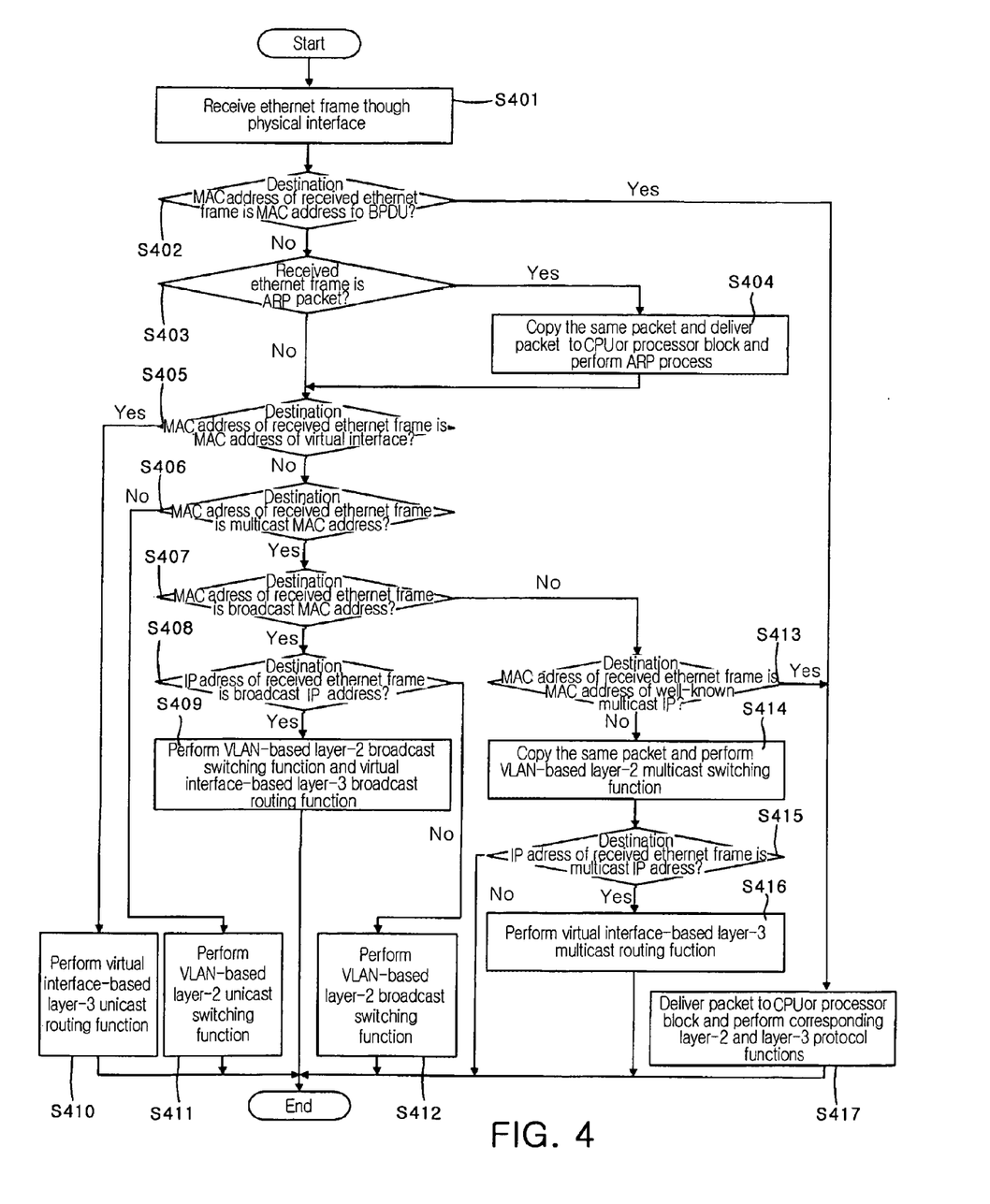
FIG. 4 is a flowchart illustrating a process for processing a multicast Ethernet frame according to an embodiment of the present invention.

FIG. 4 is a flowchart illustrating a procedure of processing a packet when an Ethernet frame is received in a physical interface of a system for simultaneously providing layer-2 multicast switching and layer-3 multicast routing according to an embodiment of the present invention.

Referring to FIG. 4, when an Ethernet frame is received in the system according to the present invention (S401), whether a destination MAC address of the received Ethernet frame is an MAC address of a BPDU is judged (S402).

When the destination MAC address of the received Ethernet frame is the MAC address of the BPDU as a result of the judgment, the frame is delivered to a CPU or a processor block so that corresponding layer-2 and layer-3 protocol functions are performed (S417).

On the other hand, when the destination MAC address of the received Ethernet frame is not the MAC address of the BPDU as a result of the judgment, whether the received Ethernet frame is an address revolution protocol (ARP) packet is judged (S403). At this point, the judging (S403) can be performed by exploring a "type/length" field value contained in an Ethernet header.

Meanwhile, when the received Ethernet frame is an ARP packet as a result of the judgment in an operation S403, the same packet is copied and delivered to a CPU or a processor block so that an ARP process is performed (s404). After that, whether a destination MAC address of the received Ethernet frame is an MAC address of a virtual interface is judged (S405).

On the other hand, when the received Ethernet frame is not an ARP packet as a result of the judgment in the operation S403, an operation S404 is not performed, but immediately, whether the destination MAC address of the received Ethernet frame is the MAC address of the virtual interface is judged (S405). At this point, when the destination MAC address of the received Ethernet frame is the MAC address of the virtual interface as a result of the judgment in the operation S405, a virtual interface-based layer-3 unicast routing function is performed (S410).

When the destination MAC address of the received Ethernet frame is not the MAC address of the virtual interface as a result of the judgment in the operation S405, whether the destination MAC address of the received Ethernet frame is a multicast MAC address is judged (S406).

When the destination MAC address of the received Ethernet frame is the multicast MAC address as a result of the judgment in the operation S406, whether the destination Mac address is a broadcast MAC address is judged (S407). On the other hand, when the destination MAC address of the received Ethernet frame is not the multicast MAC address as a result of the judgment in the operation S406, a VLAN-based layer-2 unicast switching function is immediately performed (S411) without the judging in the operation S407.

Meanwhile, when the destination MAC address is a broadcast MAC address as a result of the judgment in the operation S407, whether a destination IP address of the received Ethernet frame is a broadcast IP address is judged (S408). On the other hand, when the destination MAC address is not the broadcast MAC address as a result of the judgment in the operation S407, whether the destination MAC address is an MAC address of a well-known multicast IP is judged (S413). Here, the well-known multicast IP address is a multicast IP address defined for control message (such as a layer-3 routing protocol) exchange between routers.

When the destination IP address of the received Ethernet frame is the broadcast IP address as a result of the judgment in the operation S408, finally a VLAN-based layer-2 broadcast switching function and a virtual interface-based layer-3 broadcast routing function are performed on the received frame (S409). On the other hand, when the destination IP address of the received Ethernet frame is not the broadcast IP address as a result of the judgment in the operation S408, only the VLAN-based layer-2 broadcast switching function is performed (S412).

Meanwhile, when the destination MAC address is the MAC address of the well-known multicast IP assigned by an IANA as a result of the judgment in the operation S413, the received packet should be processed by a controller. Accordingly, the packet is not forwarded but delivered to a CPU or a processor block so that a corresponding layer-3 protocol function is performed (S417).

On the other hand, the destination MAC address is not the MAC address of the well-known multicast IP as a result of the judgment in the operation S413, the same packet is copied and a VLAN-based layer-2 multicast switching function is performed (S414). After that, whether a destination IP address of the received Ethernet frame is a multicast IP address is judged according to the VLAN-based layer-2 multicast switching function (S415).

At this point, the destination IP address of the received Ethernet frame is the multicast IP address as a result of the judgment in the operation S415, a virtual interface-based layer-3 multicast routing function is simultaneously performed according to an embodiment of the present invention (S416). On the other hand, the destination IP address of the received Ethernet frame is not the multicast IP address as a result of the judgment in the operation S415, the received Ethernet frame is destroyed.

Therefore, a system and a method of the present invention provide an efficient multicast method essential to an environment integrating broadcasting and communication, which is a current important trend, on a system for simultaneously providing virtual interface-based layer-2 multicast switching and layer-3 multicast routing, so that usefulness of the system can be improved.

Also, not only a bandwidth of a system is saved but also a load of a network reduces compared with a conventional method of simply broadcasting a multicast packet.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A system for simultaneously providing layer-2 multicast switching and layer-3 multicast routing, wherein a VLAN (virtual local area network)-based layer-2 switch performs a virtual interface-based layer-3 routing function, the system comprising:
   a physical interface for receiving an Ethernet frame;
   a VLAN defined on the physical interface, for performing a layer-2 multicast switching function on the received Ethernet frame through the same LAN according to a destination MAC address of the received Ethernet frame;
   a virtual interface for interfacing between the VLAN and a layer-3 router; and
   a virtual router for mapping a VLAN ID (identifier) of the VLAN to the virtual interface to perform a virtual interface-based layer-3 multicast routing function at the VLAN-based layer-2 switch on the received Ethernet frame according to a destination IP address of the received Ethernet frame,
   wherein the VLAN ID of the received Ethernet frame is maintained for the layer-2 multicast switching function and the VLAN ID of the received Ethernet frame is changed into a VLAN ID mapped to the virtual interface for the layer-3 multicast routing function.

2. The system of claim 1, wherein, when the destination MAC (media access control) address of the received Ethernet frame is a multicast MAC address, the VLAN performs the layer-2 multicast switching function.

3. The system of claim 1, wherein, when the destination IP address of the received Ethernet frame is a multicast IP address, the virtual router performs the layer-3 multicast routing function.

4. A method for simultaneously providing layer-2 multicast switching and layer-3 multicast routing, wherein a VLAN-based layer-2 switch performs a virtual interface-based layer-3 routing function, the method comprising:
   receiving an Ethernet frame through a physical interface;
   judging whether a destination MAC address of the received Ethernet frame is a multicast MAC address, copying the same packet when the destination MAC address of the received Ethernet frame is the multicast MAC address as a result of the judgment, and performing a VLAN-based layer-2 multicast switching function; and
   judging whether a destination IP address of the received Ethernet frame is a multicast IP address, and when the destination IP address of the received Ethernet frame is the multicast IP address as a result of the judgment, performing a virtual interface-based layer-3 multicast routing function at the VLAN-based layer-2 switch,
   wherein the received Ethernet frame has a VLAN ID (identifier), and the VLAN ID of the received Ethernet frame is maintained for the layer-2 multicast switching function and the VLAN ID of the received Ethernet frame is changed into a VLAN ID mapped to the virtual interface for the layer-3 multicast routing function.

5. The method of claim 4, wherein performing the VLAN-based layer-2 multicast switching function comprises:
   when the destination MAC address of the received Ethernet frame is the multicast MAC address, judging whether the destination MAC address of the received Ethernet frame is a broadcast MAC address; and
   when the destination MAC address of the received Ethernet frame is the broadcast MAC address as a result of the judgment, performing a VLAN-based layer-2 broadcast switching function.

6. The method of claim 5, further comprising, when the destination MAC address of the received Ethernet frame is the broadcast MAC address as a result of the judgment:
   judging whether the destination IP address of the received Ethernet frame is a broadcast IP address; and
   when the destination IP address of the received Ethernet frame is the broadcast IP address as a result of the judgment, performing a virtual interface-based layer-3 broadcast routing function.

7. The method of claim 4, wherein performing the VLAN-based layer-2 multicast switching function comprises:
   when the destination MAC address of the received Ethernet frame is the multicast MAC address, judging whether the destination MAC address of the received Ethernet frame is a broadcast MAC address; and
   when the destination MAC address of the received Ethernet frame is not the broadcast MAC address as a result of the judgment, copying the same packet to perform a VLAN-based layer-2 multicast switching function.

8. The method of claim 4, wherein performing the VLAN-based layer-2 multicast switching function comprises:
   when the destination MAC address of the received Ethernet frame is the multicast MAC address, judging whether the destination MAC address of the received Ethernet frame is a broadcast MAC address;
   when the destination MAC address of the received Ethernet frame is not the broadcast MAC address as a result of the judgment, judging whether the destination MAC address of the received Ethernet frame is an MAC address of a well-known multicast IP; and
   when the destination MAC address of the received Ethernet frame is the MAC address of a well-known multicast IP as a result of the judgment, delivering the packet to an upper-layer processor to process the packet.

9. The method of claim 4, wherein performing the VLAN-based layer-2 multicast switching function comprises, when the destination MAC address of the received Ethernet frame is not the multicast MAC address, performing a VLAN-based layer-2 unicast switching function.

10. The method of claim 4, further comprising, before performing the VLAN-based layer-2 multicast switching function:
   judging whether the destination MAC address of the received Ethernet frame is an MAC address of a virtual interface; and when the destination MAC address of the received Ethernet frame is the MAC address of the virtual interface, performing a virtual interface-based layer-3 unicast routing function.

11. The method of claim 4, further comprising, before performing the VLAN-based layer-2 multicast switching function:

judging whether the destination MAC address of the received Ethernet frame is an MAC address of a BPDU; and when the destination MAC address of the received Ethernet frame is the MAC address of the BPDU, delivering the packet to an upper-layer processor to process the packet.

12. The method of claim 4, further comprising, before performing the VLAN-based layer-2 multicast switching function:

judging whether the received Ethernet frame is an ARP (Address Resolution Protocol) packet;

when the received Ethernet frame is the ARP packet as a result of the judgment, copying the packet to deliver the packet to an upper-layer processor; and ARP-processing the delivered packet.

13. The method of claim 12, wherein judging whether the received Ethernet frame is the ARP packet comprises exploring type and length fields of the received packet.

\* \* \* \* \*